(12) United States Patent
Pospicil

(10) Patent No.: US 10,583,850 B1
(45) Date of Patent: Mar. 10, 2020

(54) LARGE CARGO DOLLY

(71) Applicant: John Pospicil, Huntsville, AL (US)

(72) Inventor: John Pospicil, Huntsville, AL (US)

( * ) Notice: Subject to any disclaimer, the term of this patent is extended or adjusted under 35 U.S.C. 154(b) by 0 days.

(21) Appl. No.: 16/124,462

(22) Filed: Sep. 7, 2018

(51) Int. Cl.
| | | |
|---|---|---|
| *B62B 1/20* | (2006.01) | |
| *B62B 5/06* | (2006.01) | |
| *B62B 1/26* | (2006.01) | |

(52) U.S. Cl.
CPC ............. *B62B 1/20* (2013.01); *B62B 1/26* (2013.01); *B62B 5/06* (2013.01); *B62B 2202/80* (2013.01)

(58) Field of Classification Search
CPC .............. B62B 3/02; B62B 1/12; B62B 1/125
USPC ........ 280/43.15, 43.16, 47.18, 47.34, 47.331
See application file for complete search history.

(56) References Cited

U.S. PATENT DOCUMENTS

| | | | |
|---|---|---|---|
| 2,277,302 A | | 3/1942 | Chenette |
| 2,513,020 A | * | 6/1950 | Haney ................ B62B 1/262 211/70.2 |
| 2,556,814 A | * | 6/1951 | Love ................... B62B 1/042 280/13 |
| 2,820,643 A | | 1/1958 | Cohn |
| 3,278,042 A | * | 10/1966 | Frydenberg .......... B62B 3/04 280/35 |
| 3,854,747 A | | 12/1974 | Johnston |
| 4,166,638 A | * | 9/1979 | De Prado ............ B62B 5/0083 280/638 |
| 4,214,774 A | * | 7/1980 | Kluge ................. B60P 3/1033 280/40 |
| 4,451,053 A | | 5/1984 | Alioa |
| 4,576,389 A | * | 3/1986 | Villaveces ............ B62B 3/00 267/41 |
| 4,936,595 A | * | 6/1990 | Cunningham ....... B63C 13/00 114/344 |
| 5,072,959 A | * | 12/1991 | Marullo .............. B63C 13/00 114/344 |

(Continued)

OTHER PUBLICATIONS

Valley Air Refrigeration, 10scsj36x4-1000 LB DOLLY, www.dashvisor.com/10SC36X4-1000LB.html, Feb. 14, 2018, Glendale, Arizona, United States.

(Continued)

*Primary Examiner* — Jeffrey J Restifo
(74) *Attorney, Agent, or Firm* — Dennen IP Law, LLC

(57) ABSTRACT

A large cargo dolly has a first central tube and a cross bar integral with and perpendicular to the first central tube. The cross bar has a hollow first end and a hollow second end. Further, the large cargo dolly has a first moveable tube having a circumference that is smaller than a circumference of the cross bar, and the first moveable tube moveably is coupled within the hollow first end of the cross bar and fixedly coupled to a first wheel. The first moveable tube is adjustable to fit a size of cargo placed on the first central tube and the cross bar, and the first wheel is configured to automatically adjust when the first moveable tube is adjusted. The large cargo dolly also has a second moveable tube having a circumference that is smaller than the circumference of the cross bar, and the second moveable tube is moveably coupled within the hollow second end of the cross bar and fixedly coupled to a second wheel. Furthermore, the second moveable tube is adjustable to fit the size of the cargo placed on the first central tube and the cross bar, and the first wheel is configured to automatically adjust when the second moveable tube is adjusted.

21 Claims, 4 Drawing Sheets

(56) References Cited

U.S. PATENT DOCUMENTS

| | | | | |
|---|---|---|---|---|
| 5,149,116 A | * | 9/1992 | Donze | B62B 1/20 280/47.26 |
| 5,249,823 A | * | 10/1993 | McCoy | B62B 3/02 280/144 |
| 5,299,817 A | * | 4/1994 | Chang | B62B 5/0083 280/35 |
| 5,433,460 A | * | 7/1995 | Young | B62B 5/0083 280/35 |
| 5,465,996 A | * | 11/1995 | Wisz | A45C 13/385 280/35 |
| 5,476,282 A | * | 12/1995 | Dahl | B62B 1/002 280/47.18 |
| 5,484,154 A | * | 1/1996 | Ward | B62B 1/26 280/43.1 |
| 5,599,031 A | * | 2/1997 | Hodges | B62B 5/0083 280/35 |
| 5,779,252 A | * | 7/1998 | Bolton, Jr. | B62B 3/02 280/35 |
| 6,032,964 A | * | 3/2000 | Capobianco | B62B 5/0083 280/414.2 |
| 6,036,219 A | * | 3/2000 | Oefelein | B62B 3/02 280/35 |
| 6,071,061 A | * | 6/2000 | Monnin | B62B 1/04 242/597 |
| 6,079,941 A | * | 6/2000 | Lee | B62B 3/04 16/35 R |
| 6,095,746 A | * | 8/2000 | Bergin | B62B 5/0083 269/17 |
| 6,109,625 A | * | 8/2000 | Hewitt | B60B 33/0007 280/43.24 |
| 6,109,644 A | * | 8/2000 | Cox | B62B 1/20 280/47.24 |
| 6,203,031 B1 | * | 3/2001 | Leverington | B62B 5/0083 280/35 |
| 6,371,497 B1 | * | 4/2002 | Scire | B62B 5/0083 280/42 |
| 6,530,584 B1 | | 3/2003 | Lucy | |
| 6,783,147 B1 | * | 8/2004 | Green, Sr. | B62B 1/20 280/47.26 |
| 6,786,503 B1 | * | 9/2004 | Young | B62B 3/008 280/35 |
| 6,824,152 B1 | * | 11/2004 | Scott | B62B 3/02 280/43.16 |
| 7,004,481 B1 | * | 2/2006 | Stanish | A45C 5/146 190/108 |
| 7,419,170 B2 | * | 9/2008 | Krizan | B62B 3/108 280/47.35 |
| 7,762,566 B2 | * | 7/2010 | Wang | B62B 5/0083 280/651 |
| 8,251,379 B2 | * | 8/2012 | Watzke | B62B 1/125 280/35 |
| 8,475,109 B2 | | 7/2013 | Torrison | |
| 8,733,767 B2 | * | 5/2014 | Roberts | B62B 5/0083 280/414.2 |
| 9,592,998 B2 | * | 3/2017 | Pilgrim | B66C 19/005 |
| 2003/0091417 A1 | | 5/2003 | Swann | |
| 2004/0119262 A1 | * | 6/2004 | Stout | B60D 1/00 280/415.1 |
| 2007/0292252 A1 | | 12/2007 | McGill | |
| 2010/0320710 A1 | | 12/2010 | Dufour | |
| 2011/0052356 A1 | | 3/2011 | Leatherman | |
| 2012/0153585 A1 | | 6/2012 | Ryan | |
| 2017/0291621 A1 | | 10/2017 | Green | |

OTHER PUBLICATIONS

Pro-Lift, An Award-Winning AC Lift to Make HVAC Transport a Breeze, http://pro-lift.com, Feb. 14, 2018, Terrell, Texas, United States.

* cited by examiner

LARGE CARGO DOLLY

BACKGROUND OF THE DISCLOSURE

Often large cargo, such as an appliance, needs to be moved for repair, removal or installation. This type of large cargo is often difficult to move on a typical dolly. In this regard, a typical dolly has a tall frame with a handle on the top of the frame. Coupled to the bottom of the frame is a nose plate. A typical nose plate does not extend in width or length enough to fully go under the appliance for moving. This makes it difficult to move the appliance.

BRIEF DESCRIPTION OF THE DRAWINGS

The system is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The detailed description describes an exemplary dolly in accordance with an embodiment of the present disclosure. The exemplary dolly comprises a frame having a first central tube that has a first circumference. The first central tube is hollow. Attached to one end of the first central tube is an angled tube that extends at an angle vertically. At the top of the angled tube is a handle coupled perpendicular to the angled tube. Coupled at the opposing end of the first central tube is a second central tube. In this regard, an end portion of the first central tube has a circumference that is less than the circumference of the second central tube such that the end of the first central tube fits within the second central tube. Note that when not in use, the first and second central tubes may be decoupled for storage.

Perpendicular to the second central tube is a cross tube. The cross tube may be integral with or coupled to the second central tube. The cross tube is hollow. At one end of the cross tube is a first moveable tube having a circumference that is less than the circumference of the cross tube such that the first moveable tube fits within the cross tube. At the other end of the cross tube is a second movable tube having a circumference that is less than the circumference of the cross tube such that the second moveable tube fits within the cross tube. On non-insertions ends, each moveable tube is fixedly coupled to a stop and an axle, and a wheel is rotatably coupled to each axle. Thus, when the moveable tubes are adjusted, the stops, the axles, and the wheels are automatically adjusted accordingly.

In use, large cargo rests on the central tubes and the cross tube. Further, the moveable tubes are configured to move inward or outward relative to the cross tube so that different sizes of cargo may be secured horizontally to the dolly via the stops.

Figure 1:
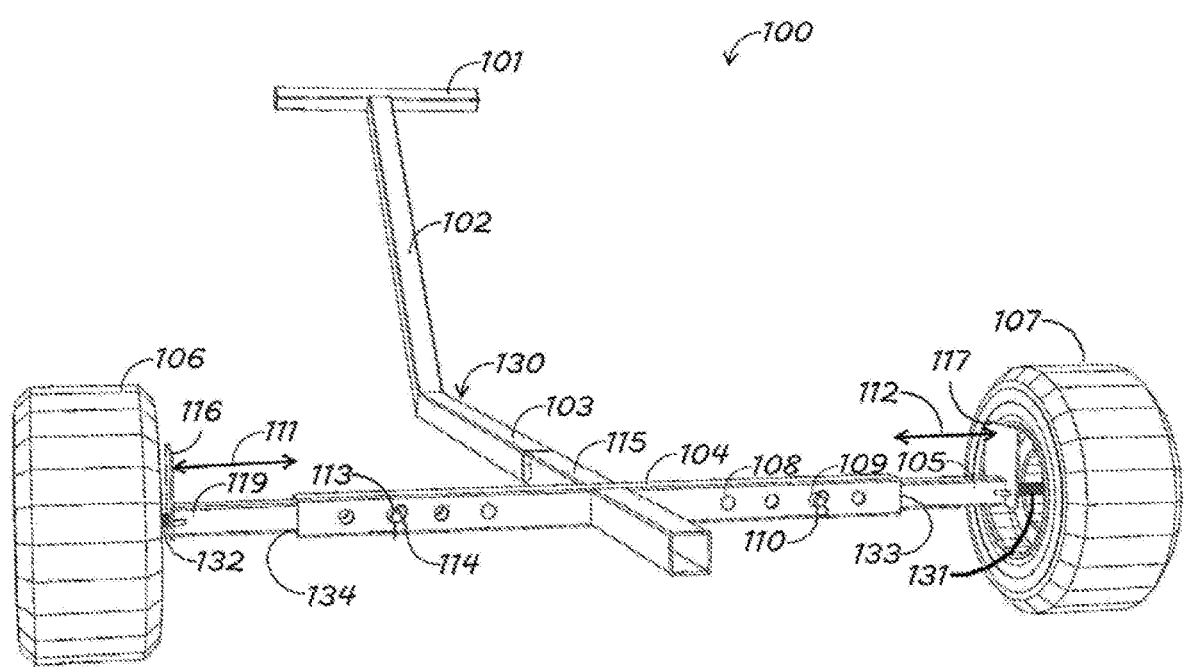
FIG. 1 is a perspective view of an exemplary large cargo dolly in accordance with an embodiment of the present disclosure.

FIG. 1 is a perspective view of a large cargo dolly 100 in accordance with an embodiment of the present disclosure.

The large cargo dolly 100 has a frame 130 comprising two separate central tubes 103 and 115 that are removeably coupled. Thus, when not in use, the central tube 103 may be decoupled from the central tube 115 for storage of the large cargo dolly 100. In one embodiment, each of the central tubes 103 and 115 are hollow and are comprised of metal. Note that the tubes 103 and 115 may have a square or rectangular cross-section; however, other shaped cross-sections are possible in other embodiments.

A portion of an insertion end of the central tube 103 has a circumference that is smaller than the circumference of the other central tube 115. In this regard, this portion of the central tube 103 that is smaller fits within and couples to the inside of the central tube 115. As noted, when not in use, the central tubes 103 and 115 may be decoupled for easier storage of the dolly 100.

On an opposing end of the central tube 103, opposite the insertion end, the central tube 103 is integral with or coupled to an angled, vertically-extending tube 102. At the top of the angled, vertically extending tube 102 is a handle 101. Note that in one embodiment, the angled, vertically-extending tube 102 is made of metal; however other materials are possible in other embodiments. Further note that the angled, vertically-extending tube 102 may have a square or rectangular cross-section; however other shaped cross-sections are possible in other embodiments.

The handle 101 is perpendicularly coupled to or integral with a top end of the angled, vertically extending tube 102. The handle 101 is positioned for pushing or pulling the large cargo dolly 100 when moving cargo (not shown). In one embodiment, the handle 101 is made of a metal tube and has a circular cross-section. However, other materials and different shaped cross-sections are possible in other embodiments.

The frame 130 further comprises a cross tube 104. The cross tube 104 perpendicularly intersects the central tube 115. Note that in other embodiments, the cross tube 104 may perpendicularly intersect the central tube 103. Further note that the cross tube 104 may be integral with the central tube 115 or the cross tube 104 may be made up of two separate sections, a tube on each side of the central tube 115 that are integral with the central tube 115. The cross tube 104 is hollow and has a plurality of side openings 108 on both sides of the cross tube 104. Note that the cross tube 104 may be comprised of a metal material in one embodiment; however, the cross tube 104 may be made of other materials in other embodiments. Further note that the cross tube 104 has a square or rectangular cross-section; however, the cross tube 104 may have other shaped cross-sections in other embodiments In one embodiment, a portion of the central bar 115 extends past the intersection of the central bar 115 and the cross bar 104. That portion of the central bar 115 that extends past the intersection of the central bar 115 and the cross bar 104 further supports cargo that is placed on the frame 130.

Coupled on a first end 133 of the cross tube 104 is a moveable tube 105 that has a circumference that is less than the circumference of the cross tube 104. Note that the moveable tube 105 comprises at least one side opening (not shown) that extends through the moveable tube 105. Because the cross tube 104 is hollow, the moveable tube 105 moveably fits within the cross tube 104 at the first end 133 of the cross tube 104. Note that the moveable tube 105 may be made of metal and have a square or rectangular cross-section; however, the moveable tube 105 may be made of different materials and have other shaped cross-sections in other embodiments.

Further, on a second end 134 of the cross tube 104 is a moveable tube 119 that has a circumference that is less than the circumference of the cross tube 104. Note that the moveable tube 119 comprises at least one side opening (not shown) that extends through the moveable tube 119. Because the cross tube 104 is hollow, the moveable tube 119 moveably first within the cross tube 104 at the second end 134 of the cross tube 104. Note that the moveable tube 119 may be made of metal and have a square or rectangular cross-section; however, the moveable tube 119 may be made of different materials and have other shaped cross-sections in other embodiments.

Note that the moveable tube 105 moves inward and outward in a horizontal direction as indicated by reference arrow 112. Further, the moveable tube 119 moves inward and outward in a horizontal direction as indicated by reference arrow 111. Thus, the width of the large cargo dolly 100 may be adjusted depending upon the size of the cargo that is being transported.

Each of the moveable tubes 105 and 119 comprise the at least one opening. To secure the moveable tubes 105 and 119 to the cross tube 104, the moveable tubes 105 and 119 are moved inward or outward depending upon the size of the cargo that is placed on the frame 130. One of the openings 108 in the cross tube 104 is aligned with the at least one opening in the moveable tube 105, and one of the openings 108 is aligned with the at least one opening in the moveable tube 119.

Once aligned, hitch pins 109 and 113 are inserted through the aligned openings in the moveable tubes 105 and 119 and the openings 108. Further, clips 110 and 114 secure the hitch pins 109 and 113, respectively, thereby coupling the moveable tubes 105 and 119 to the frame 130. Once the hitch pins 109 and 113 are inserted and secured by clips 110 and 114, the moveable tube 105 and the moveable tube 119 are secured relative to the frame 130. Note that eight openings 108 are shown in the cross tube 104. Thus, the moveable tubes 105 and 119 may be moved and secured at each of the openings 108 in the cross tube 104 depending upon the width of the cargo being transported. Note that while eight openings 108 are showed, the cross tube 104 may comprise more or fewer openings 108 in other embodiments. Further note that while a hitch pin and a clip are described for coupling the moveable tubes 105 and 119 to the frame 130, other types of coupling devices may be used in other embodiments.

Further, coupled to the non-insertion end of the moveable tube 105 is a stop 117. The stop 117 moves as the moveable tube 105 is adjusted, and once adjusted to fit cargo on the frame 130, the stop 117 is positioned adjacent the cargo thereby horizontally stabilizing the cargo. The stop 117 is substantially rectangular and extends vertically upward from the moveable tube 105. The stop 117 may be made of metal in one embodiment; however, the stop 117 may be made of other materials in other embodiments. Further, while the stop 117 is shown as rectangular, the stop 117 may be other shapes in other embodiments.

Further, coupled to the non-insertion end of the moveable tube 119 is a stop 116. The stop 116 moves as the moveable tube 119 is adjusted, and once adjusted to fit cargo on the frame 130, the stop 116 is positioned such that it will be adjacent the cargo thereby horizontally stabilizing the cargo. The stop 116 is substantially rectangular and extends vertically upward from the moveable tube 119. The stop 116 may be made of metal in one embodiment; however, the stop 117 may be made of other materials in other embodiments. Further, while the stop 116 is shown as rectangular, the stop 117 may be other shapes in other embodiments.

Further, the dolly 100 comprises at least two axles 131 and 132. A tire 107 is rotationally coupled to the axle 131. In use, the tire 107 rotates relative to the axle 131; however, the axle 131 does not rotate when the tire 107 rotates. The axle remains stationary. In this regard, the axle 131 is fixedly coupled to the inside of the hollow cross tube 104. In one embodiment, the axle 131 is welded to the inside of the hollow cross tube 104.

Further, a tire 106 is rotationally coupled to the axle 132. In use, the tire 107 rotates relative to the axle 132; however, the axle 132 does not rotate when the tire 106 rotates. In this regard, the axle 132 is fixedly coupled to the inside of the hollow cross tube 104. In one embodiment, the axle 132 is welded to the inside of the hollow cross tube 104.

As noted above, the large cargo dolly 100 further comprises stops 116 and 117. Stop 116 comprises an opening (not shown) through which the axle 132 extends so the axle 132 may be coupled to the cross tube 104. Further, stop 117 comprises an opening (not shown) through which axle 131 extends so the axle 131 may be coupled to the cross tube 104. When the moveable tubes 105 and 119 are moved inward or outward to adjust the width for cargo, the stops 117 and 116 and the tires 107 and 106 also move inward and outward. The stops 117 and 116 ensure that the cargo on the frame 130 does not move either to the left or right during transport.

Once the large cargo is placed on the frame 130, the user (not shown) adjusts the moveable tubes 105 and 119 either inward or outward to fit the cargo on the frame 130. Once the moveable tubes 105 and 119 are in position to secure the cargo, the stops 117 and 116 ensure that the cargo does not move horizontally during transport.

Figure 2:
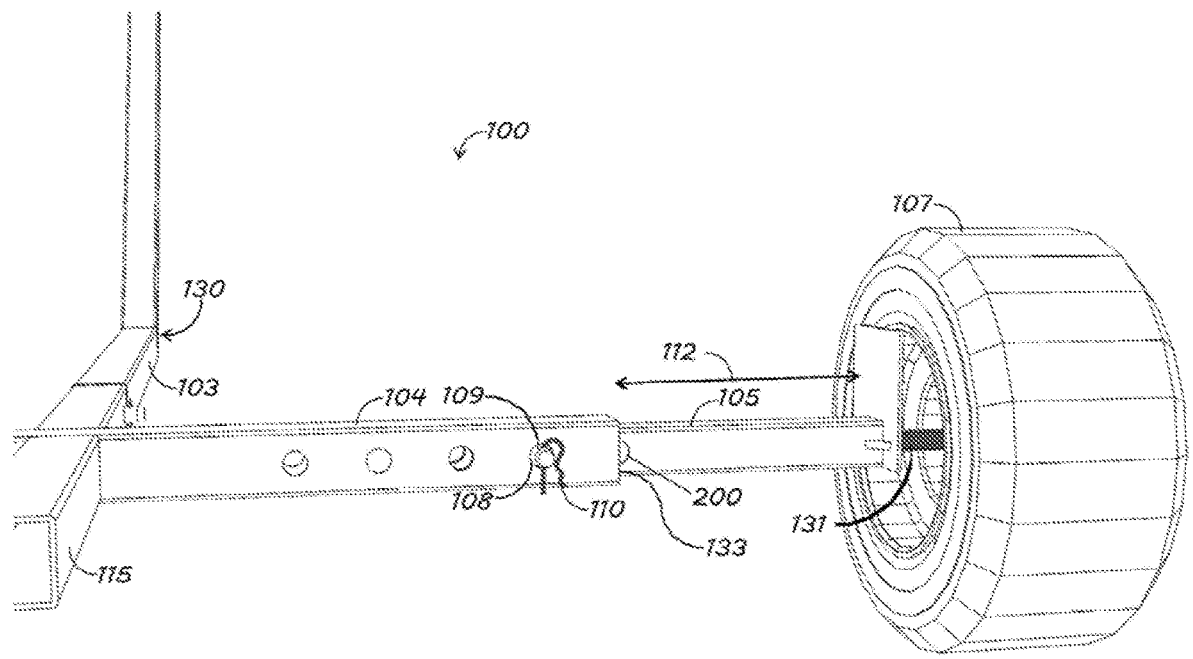
FIG. 2 is a perspective close-up view of a moveable cross tube of the large cargo dolly shown in FIG. 1.

FIG. 2 depicts a close-up view of one side of the large cargo dolly 100 showing the moveable tube 105, the stop 117, the axle 131, and the tire 107. Note that only one side is shown; however, the other side comprised of the moveable tube 119, the stop 116, the axle 132, and the tire 106 works identical to the side shown in FIG. 2. Thus, the following description applies to both sides of the large cargo dolly 100.

A portion of the frame 130 is shown. In this regard, the first and second central tubes 103 and 115 are shown coupled together. Further, the cross tube 104 is perpendicularly coupled to the second central tube 115.

The cross tube 104 comprises the plurality of openings 108. Note that only four openings 108 are shown; however, more or fewer openings 108 may be used in other embodiments.

Further shown in FIG. 2 is the moveable tube 105 having a circumference that is less than the circumference of the cross tube 104. Thus, the moveable tube 105 fits snugly within the cross tube 104.

The moveable tube 105 comprises one or more openings 200. In use, the moveable tube 105 is moved outward or inward until the opening 200 of the moveable tube 105 aligns with one of the plurality of openings 108 in the cross tube 104.

Once alignment is achieved between an opening 200 in the moveable tube 105 and an opening 108 in the cross tube 104, the moveable tube 105 may be secured to the frame 130. In one embodiment, the hitch pin 109 is inserted through one of the plurality of openings 108 in the cross tube 104 and the opening 200 in the moveable tube 105. After the hitch pin 109 is inserted, clip 110 is inserted in an opening (not shown) in the hitch pin 109. Insertion of the clip 110 in the hitch pin 109 secures the moveable tube 105 to the frame 130.

Note that the stop 117 moves with the moveable tube 105. Thus, the user moves the moveable tube 106 until the stop 117 is situated such that it will be adjacent cargo (not shown) on the frame 130. The stop 117 prevents the cargo from moving left or right once the moveable tube 105 is secured to the frame 130.

Figure 3:
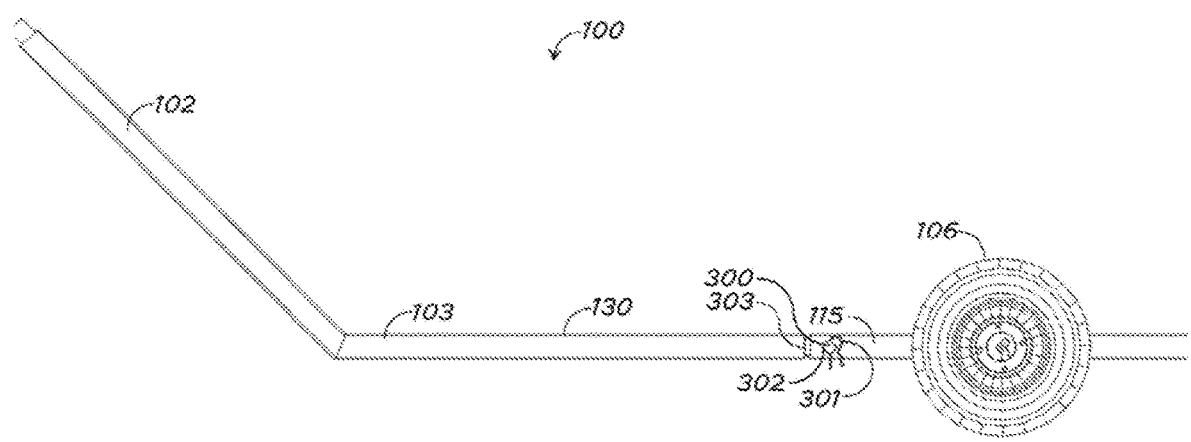
FIG. 3 is a side view of the large cargo dolly shown in FIG. 1.

FIG. 3 is a side view of the large cargo dolly 100 in accordance with an embodiment of the present disclosure. A portion of the frame 130 is depicted. In this regard, the central tube 103 is shown. Extending from one end of the central tube 103 is the angled tube 102, and on the uppermost end of the angled tube 102 is the handle 101 (FIG. 1). This allows a user to push or pull the large cargo dolly 100 when in use.

Further, the central tube 103 comprises an end 303 having a circumference that is less than the circumference of the central tube 115. When in use, the end 303 of the central tube 103 is inserted within and coupled to the inside of the central tube 115.

In this regard, the end 303 of the central tube 103 comprises an opening (not shown) on a side of the end 303. Also, the central tube 115 comprises an opening 302 on a side of the central tube 115. To couple the central tube 103 to the central tube 115, a user aligns the opening on the side of the end 303 with the opening 302. A hitch pin 300 is inserted through the opening 302 and the opening in side of the end 303. A clip 301 is inserted into an opening (not shown) in the hitch pin 300. Once the clip 301 is inserted, the central tube 103 is coupled to the central tube 115. Note that while a hitch pin and a clip are described for coupling the central tube 103 to the central tube 115, other types of coupling devices may be used in other embodiments.

Note that while not in used, the central tube 103 may be decoupled from the central tube 115. Decoupling the central tube 103 from the central tube 115 allows for the large cargo dolly 100 to be more easily stored.

Figure 4:
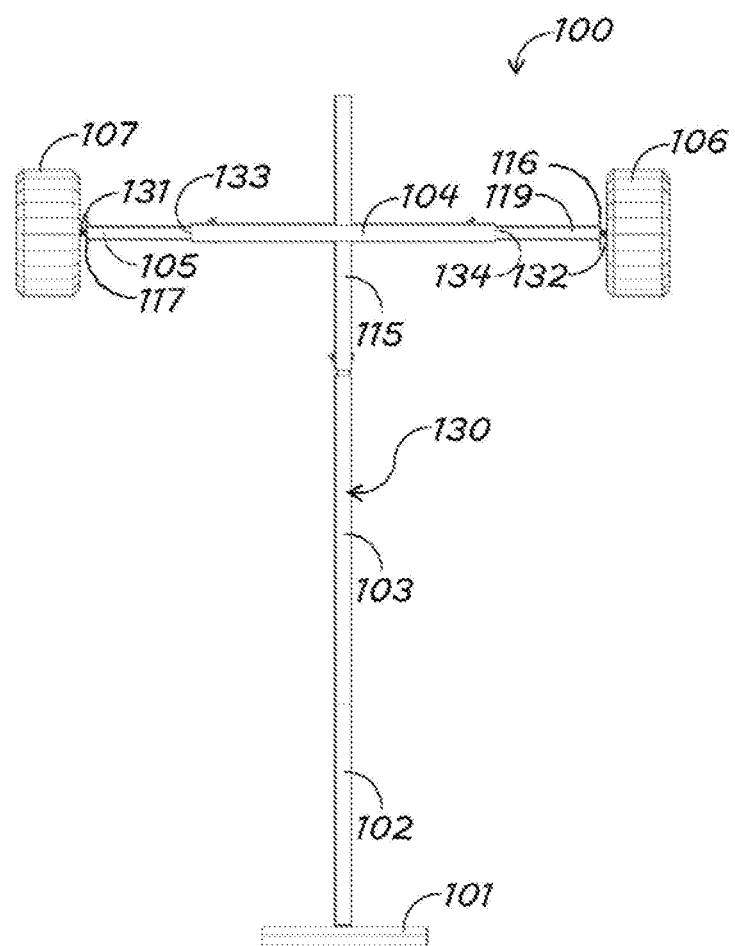
FIG. 4 is a top view of the large cargo dolly shown in FIG. 1.

FIG. 4 is a top view of the large cargo dolly 100. The top view shows the frame 130 comprising the central tube 103. The frame further comprises the angled tube 102 extending from the central tube 103. At the top end of the angled tube 102 is a handle 101. The handle 101 may be used for pushing and/or pulling the large cargo dolly 100 while in use.

Further, the frame 130 comprises the central tube 115, which is coupled to the central tube 103. As noted above, the central tube 103 is removeably coupled to the central tube 115. In one embodiment, coupling is effectuated through use of a hitch pin and a clip. When not in use, central tube 103 may be removed from central tube 115 so that the large cargo dolly 100 may be more easily stored.

The frame 130 further comprises the cross tube 104. Coupled to or integral with the central tube 115 is the cross tube 104, which is hollow. In use, cargo (not shown) rests upon the central tube 103, the central tube 115, and the cross tube 104 for transport.

On one end 133 of the cross tube 104, a moveable tube 105 is inserted within the cross tube 104. Further, on the opposing end 134 of the cross tube 104, a moveable tube 119 is inserted within the cross tube 104.

The moveable tube 105, the stop 117, and the axle 131 are fixedly coupled together. Thus, to adjust the width of the frame 130, a user may move the moveable tube 105, the stop 117, and the axle 131 inward or outward depending upon the cargo width. Note that the wheel 107 is rotationally coupled to the axle 131, and when the moveable tube 105 is adjusted, the wheel 107 also moves with the moveable tube 105.

The moveable tube 119, the stop 116, and the axle 132 are fixedly coupled together. Thus, to adjust the width of the frame 130, a user may move the moveable tube 119, the stop 116, and the axle 132 inward or outward depending upon the cargo width. Note that the wheel 106 is rotationally coupled to the axle 131, and when the moveable tube 119 is adjusted, the wheel 106 also moves with the moveable tube 119.

What I claim is:

1. A large cargo dolly, comprising:
   a first central tube;
   a second central tube slidably coupled on a first end to a first end of the first central tube, the second central tube directly connected on a second end to a first end of a vertically extending tube that extends at an obtuse angle directly from the second end of the second central tube and wherein the vertically extending tube does not extend vertically below the second central tube;
   only one cross bar integral with, flush with, and perpendicular to the first central tube, the cross bar having a hollow first end and a hollow second end so that cargo sits evenly on the only one cross bar and the first central tube;
   a first moveable tube having a circumference that is smaller than a circumference of the cross bar, the first moveable tube moveably coupled within the hollow first end of the cross bar and fixedly coupled to a first wheel, the first moveable tube configured to be adjusted to fit a size of cargo placed on the first central tube and the cross bar, and the first wheel is configured to automatically adjust when the first moveable tube is adjusted, the first moveable tube comprising a first locking mechanism for securing the first moveable tube to the cross tube at varying distances from the first central tube;
   a second moveable tube having a circumference that is smaller than the circumference of the cross bar, the second moveable tube moveably coupled within the hollow second end of the cross bar and fixedly coupled to a second wheel, the second moveable tube configured to be adjusted to fit the size of the cargo placed on the first central tube and the cross bar, and the first wheel is configured to automatically adjust when the second moveable tube is adjusted, the second moveable tube comprising a second locking mechanism for securing the second moveable tube to the cross tube at varying distances from the first central tube.

2. The large cargo dolly of claim 1, wherein the angled tube is coupled on a second end to a handle that is perpendicular to the second end of the angled tube.

3. The large cargo dolly of claim 1, wherein the first central tube has side openings and the end of the second central tube has side openings.

4. The large cargo dolly of claim 3, further comprising a hitch pin that fits within the side openings of the first central tube and the side ends of the second central tube when the first central tube side openings are aligned with the second central tube side openings.

5. The large cargo dolly of claim 4, further comprising a hitch pin that is inserted in a hitch pin opening to secure the first central tube to the second central tube.

6. The large cargo dolly of claim 1, further comprising a first stop fixedly coupled to the first moveable tube such that when the first moveable tube is adjusted, the first stop is automatically adjusted to secure cargo.

7. The large cargo dolly of claim 6, further comprising a second stop fixedly coupled to the second moveable tube such that when the second moveable tube is adjusted, the second stop is automatically adjusted to secure cargo.

8. The large cargo dolly of claim 7, wherein the first stop and the second stop are substantially rectangular.

9. The large cargo dolly of claim 1, wherein the first moveable tube comprises one or more side openings and the cross tube comprises one or more side openings.

10. The large cargo dolly of claim 9, further comprising a hitch pin inserted into one of the side openings of the first moveable tube and one of the side openings of the cross tube when one of the first moveable tube side openings is aligned with one of the cross tube side openings.

11. The large cargo dolly of claim 10, further comprising a clip that is inserted in an opening of the hitch pin to couple the first moveable tube to the cross tube.

12. The large cargo dolly of claim 1, wherein the second moveable tube comprises one or more side openings and the cross tube comprises one or more side openings.

13. The large cargo dolly of claim 12, further comprising a hitch pin inserted into one of the side openings of the second moveable tube and one of the side openings of the cross tube when one of the second moveable tube side openings is aligned with one of the cross bar side openings.

14. The large cargo dolly of claim 13, further comprising a clip that is inserted in an opening of the hitch pin to couple the second moveable tube to the cross tube.

15. The large cargo dolly of claim 1, wherein the first moveable tube is fixedly coupled to a first stop and a first axle, and the first wheel is rotatably coupled to the first axle.

16. The large cargo dolly of claim 15, wherein when the first moveable tube is adjusted, the first stop, the first axle, and the first wheel are adjusted.

17. The large cargo dolly of claim 16, wherein the second moveable tube is fixedly coupled to a second stop and a second axle, and a second wheel is rotatably coupled to the second axle.

18. The large cargo dolly of claim 17, wherein when the first moveable tube is adjusted, the second stop, the second axle, and the second wheel are adjusted.

19. The large cargo dolly of claim 1, wherein the first central bar is sized to extend past the cross bar for providing additional support of cargo resting on the first central bar and the cross bar.

20. The large cargo dolly of claim 1, wherein the first end of the second central tube slidably couples on the first end of the first central tube such that the coupling is substantially central between the second end of the second tube and a second end of the first tube so that the large cargo dolly may be taken apart into two sections for storage.

21. The large cargo dolly of claim 1, wherein the second end of the first central tube does not extend at a right angle vertically upward.

* * * * *